United States Patent [19]

Niconchuk

[11] Patent Number: 4,479,408

[45] Date of Patent: Oct. 30, 1984

[54] INSERTION TOOL FOR CORD-TYPE TUBELESS TIRE REPAIRING

[75] Inventor: Alec W. Niconchuk, Peabody, Mass.

[73] Assignee: North Shore Laboratories Corporation, Peabody, Mass.

[21] Appl. No.: 387,544

[22] Filed: Jun. 11, 1982

[51] Int. Cl.³ .............................................. B60C 25/16
[52] U.S. Cl. .................................................... 81/15.7
[58] Field of Search ....................... 81/15.7, 15.2, 15.5

[56] References Cited

U.S. PATENT DOCUMENTS

| | | | |
|---|---|---|---|
| 606,570 | 6/1898 | McAllister | 81/15.7 |
| 616,109 | 12/1898 | Kelly et al. | 81/15.7 |
| 617,810 | 1/1899 | Kelly | 81/15.7 |
| 1,000,168 | 8/1911 | Glanz | 81/15.7 |
| 1,410,819 | 3/1922 | McNemar | 81/15.7 |

Primary Examiner—Roscoe V. Parker
Attorney, Agent, or Firm—Robert B. Russell

[57] ABSTRACT

A tool is provided for inserting an impregnated fibrous "string" or "cord" type repair into a puncture in a tubeless tire in which the bending stress is minimized such that any given repair can withstand greater stress than hitherto during insertion and/or weaker and more malleable repair materials may be employed.

2 Claims, 9 Drawing Figures

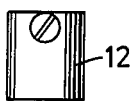
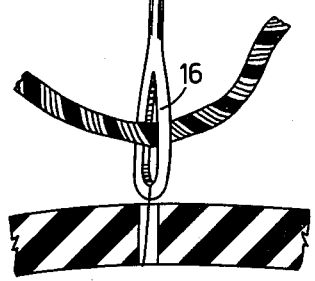
FIG.1
FIG.2 PRIOR ART
FIG.3 PRIOR ART
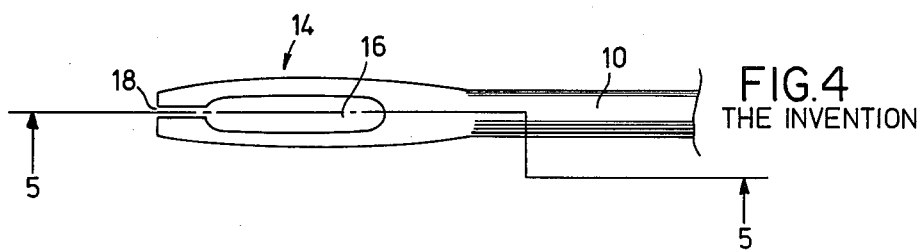
FIG.4 THE INVENTION
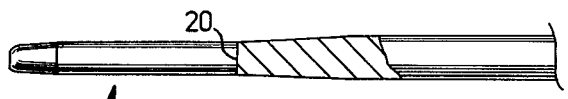
FIG.5 THE INVENTION

THE INVENTION

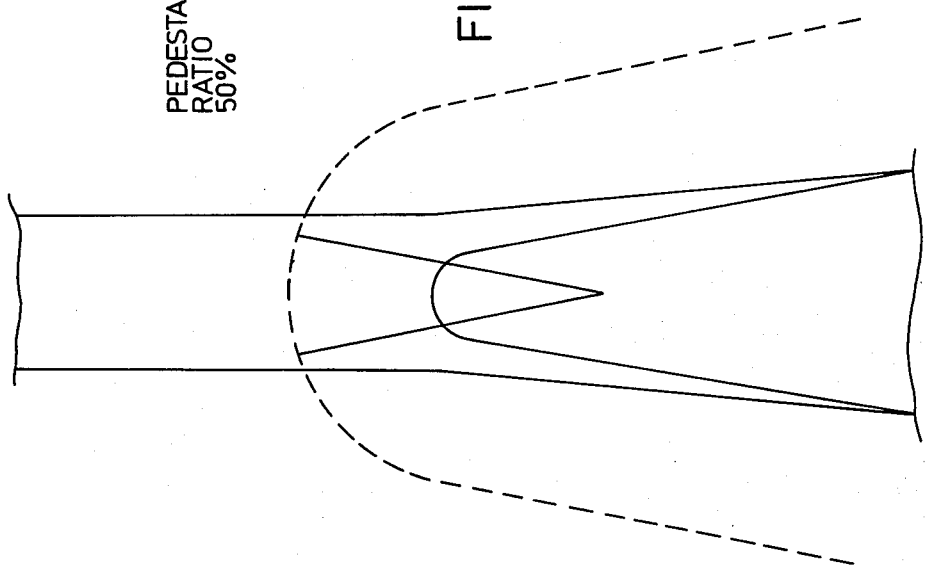
FIG.8 PEDESTAL RATIO 50%
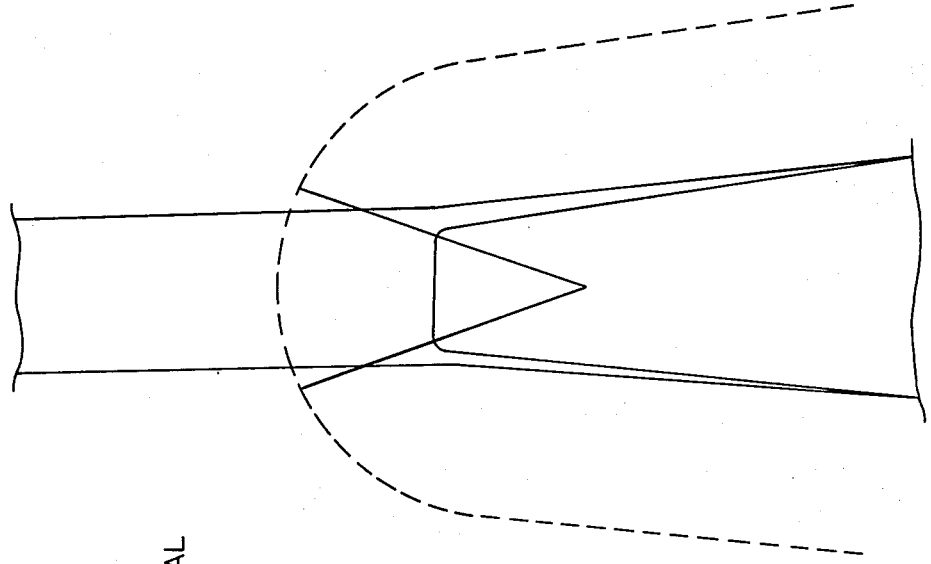
FIG.9 PEDESTAL RATIO 75%

INSERTION TOOL FOR CORD-TYPE TUBELESS TIRE REPAIRING

FIELD OF THE INVENTION

This invention relates to repairing tubeless tires from the outside by means of what are commonly called "string repairs" or "cord repairs" (referred to herein by the latter term). Cord repairs are typically short lengths of braided or twisted yarn heavily impregnated with an elastomer. Repairs are made with them by forcing them into a puncture (or cut) in the tire by means of a tool which permits the cord to be pushed into the puncture and the tool to be extracted without simultaneously extracting the cord. More particularly, the present invention relates to the tool for inserting such repairs into the tire. Still more particularly, the invention relates to such a tool adapted specifically to minimize the risk of cord breakage during insertion and/or to permit the use of relatively weak cord material.

BACKGROUND OF THE INVENTION

The design and contruction of cord-type repairs presents a number of mutually conflicting criteria. Thus, it is imperative that the cord be strong enough to avoid breaking during insertion. This requirement is easy to meet because it is a simple matter to provide a cord of sufficient strength to withstand insertion, by employing a tightly twisted or a braided cord material. The problem with this, however, is that such cords do not readily conform to the random shapes of typical punctures. In addition, it is very difficult to impregnate such tightly twisted cords thoroughly enough and with sufficient elastomer to provide an impermeable repair. Experience has shown that the elastomer-to-cord ratio must be at least 180 parts by weight of elastomer to 100 parts by weight of cord (preferably over 200 parts of elastomer), and that the impregnation must reach the core of the individual yarns which comprise the cord. Also, the cord must be relatively soft and malleable so that it can yield to the contour of a cut or puncture. These requirements dictate the use of relatively loosely twisted and hence weak cords, and, of course, as these criteria are increasingly satisfied, the risk of breakage during insertion increases proportionately.

The size of the cord also imposes further restriction. Thus, while it is desireable to have a large cord with sufficient malleability to fit a wide range of puncture sizes, the larger the cord is, the more resistance it has to insertion and hence the greater is the risk of breakage.

Considerable attention has been paid in the past to the tools employed in the insertion of cord repairs. Thus, a tightly twisted cord of the right size can be strong enough to be inserted into a puncture with a simple screw driver, but, as explained above, such a tightly twisted cord does not make a good repair. When the cord is soft and malleable, however, sufficiently to yield to the contour of typical punctures, the shear forces created by insertion with a screw driver are so great that breakage generally occurs. This problem is aggravated as the cord diameter is increased. In addition, a screw driver or similar simple probe tends to pull the repair back out through the puncture, again increasingly with size. For these reasons cord-type repair tools as described in U.S. Pat. No. 3,783,715 and D-239, 430 have been employed. Such tools have a cylindrical body with an elongated eye at one end and a slit communicating between that end of the tool and the eye. The base of the eye is provided with tapered recesses on each side extending toward the shank of the tool. These recesses minimize the shear forces acting on the cord during insertion. The slit at the end of the eye is designed so that, after the cord has been inserted, the tool will draw a loop of the cord (inside the tire) back toward the puncture and, before releasing the loop through the slit, it wedges the loop against the cord in the puncture. This wedging action together with the high degree of adhesion between mutually contacting surfaces of the impregnated cord material greatly increases the resistance of the cord to extraction and thereby increases the ability of the tool to be withdrawn without simultaneously withdrawing the cord. In addition, tools of this type have the added advantage over simple probes of the screw driver type, in that the tip end of the tool leads the way into the puncture and widens the opening prior to the cord's coming into any contact with the tire. This reduces abrasion on the cord.

Although tools of the type described have permitted successful insertion of cords of an appropriate minimum size which are sufficiently malleable and weak to make adequate repairs, there has continued to be a need for a tool which will permit even weaker, more malleable cords and/or larger cords to be inserted without breakage. It is a basic object of this invention to provide such a tool.

BRIEF DESCRIPTION OF THE INVENTION

This invention stems first from the discovery that, in the context of inserting a cord repair into a rubber tire, as distinguished for example from inserting a threaded needle into leather or into a fabric, there is virtually no need to provide the base of the eye with tapered recesses to protect the cord against the concentration of shear forces. Exactly why this happens is not known. It is possible that the friction between the needle and the puncture walls deform the puncture in such a way that the puncture wall itself provides a tapering concentration and distribution of the shear forces. Whatever the explanation may be, it is a fact that the elimination of the tapered recesses at the base of the eye, in the tools of the prior art, has no observable deleterious effect. With steel belted radial tires this requires that the tool be first inserted with the flat part of the tool parallel to the reinforcing and then twisted 90% before attempting to pass the yarn beyond the wire.

A second discovery leading to the present invention is that significant improvement can be achieved provided the width of the cord-driving pedestal at the base of the eye (i.e., the relatively flat part which applies the driving force to the cord) is over 60% of the average diameter of the effective stress area at the base of the eye (i.e., by "effective stress area" I mean that area at the base of the eye which is occupied during insertion by a single cord of appropriate size for threading into the eye). This relationship has the effect of minimizing the bending stress of the cord at the maximum stress point* and accounts for the ability of the tool of the invention to increase resistance of the cord to insertion into a puncture.

\* By the term "maximum stress point" I mean that part of the cord which lies immediately over the cord-driving pedestal where the full force of insertion is concentrated without assistance from the adhesive contact between the side walls of the tool and the cord.

These discoveries have led to an optimum design for an insertion tool which, in a preferred embodiment, comprises a cylindrical shank one end of which terminates in a flat portion which is recessed to provide an eye having a slit which communicates between the eye and the free end of the tool. The flat portion of the tool is approximately 0.1" thick, and the base of the eye is formed to provide a relatively flat cord-driving pedestal the full width of the flat portion. The eye is designed for accepting an impregnated cord having a maximum relaxed diameter of about 0.220". Under stress, during insertion, in the base of the eye, such a cord has an average stress diameter (i.e., by "average stress diameter" I mean the average diameter at the base of the eye under the stress of insertion) of about 0.130". Thus, the base of the eye in the preferred embodiment has an average diameter of 0.130" in its effective stress area," and the width of the cord-driving pedestal is approximately 77% of that average diameter.

Tests have shown that despite the fact that the inventive tool concentrates the shear forces, a conventional cord having a nominal stress diameter of 0.130", can withstand nearly twice the insertion strain using the tool of the preferred embodiment than with the prior art tools described above (e.g., U.S. Pat. No. 3,783,715). Thus, with the inventive tool, much weaker and hence more malleable cords can be used. Also larger cords (flattened for threading), or several cords of the same diameter can be used with the inventive tool without any greater risk of breakage during insertion than using the conventional tool with a single cord. In addition, other types of repair material which have hitherto been too weak to withstand insertion such as impregnated tape, can be used in place of conventional cords. By making the tool no thicker in the flattened area than the width of the cord-driving pedestal a minimum sized tool can be used for a maximum sized cord. Although this maximizes the concentration of shear stress, as noted above, there is no observable deleterious effect therefrom, and provided the tip of the tool is inserted parallel to the wires in steel belted radial tires and then turned 90% before further insertion, the tool also works well on steel belted radials.

BRIEF DESCRIPTION OF THE DRAWINGS

A preferred embodiment of the invention selected for purposes of illustration only, is shown in the accompanying drawings in which:

FIG. 1 is a view in perspective in side elevation of the insertion tool of the invention in position to be inserted into a tire;

FIG. 2 is a plan view of the eye end of the prior art tools;

FIG. 3 is a view in partial cross-section along the lines 3—3 of FIG. 2;

FIG. 4 is a plan view of the eye end of the tool of the invention;

FIG. 5 is a view in partial cross-section along the lines 5—5 of FIG. 4;

FIG. 8 is a diagrammatic view illustrating a cord-driving pedestal ratio of 50%; and, FIG. 9 is a diagrammatic view illustrating a cord-driving pedestal ratio of 75%.

DETAILED DESCRIPTION OF THE INVENTION

Figure 6:
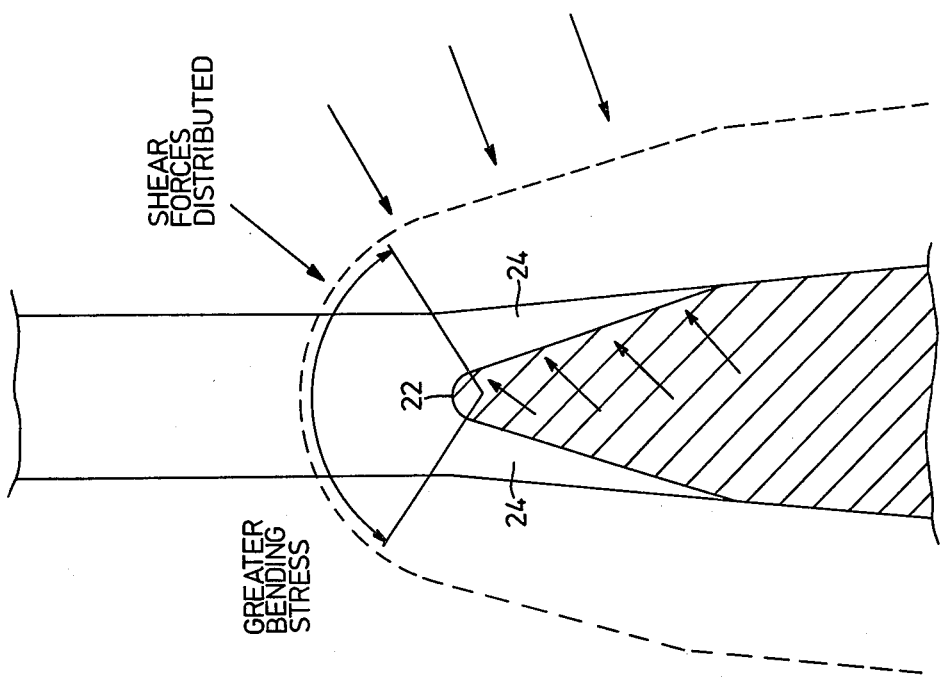
FIG. 6 is an enlarged view in partial cross-section showing the effective stress area of the tool of the prior art.

The preferred embodiment of the invention comprises an elongated shank 10 anchored in a handle 12 only part of which is illustrated. The working end of the tool comprises a flattened area indicated at 14 which is perforated to form an eye 16 and a slit 18 communicating between the free end of the tool and the eye 16. In the embodiment shown, the eye is dimensioned to accept for appropriate threading an impregnated cord (250 parts by weight of elastomer to 100 parts by weight of fiber) having a relaxed diameter of approximately 0.220". Such a cord, when subjected to the squeezing action of the eye and the stress of insertion, has an average stress diameter at the base of the eye of about 0.130". Thus, the eye 16 has an effective stress area having an average diameter of about 0.130".

The base of the eye 16 terminates in a cord-driving pedestal 20, which is substantially flat and extends for the full thickness of the flattened area 14, which in this instance is 0.1". The term "substantially flat" is not intended to convey the idea of perfect flatness and sharp corners but includes the possibility of a slight curve and rounded corners having a radius of about 0.35". The cord-driving pedestal 20, however, does present a wide pedestal surface of substantially the full dimension of the thickness of portion 14, which is 77% of the average diameter of the effective stress area of the eye 14. This provides a minimum bending stress in the maximum stress area during insertion of the cord into a puncture.

Figure 7:
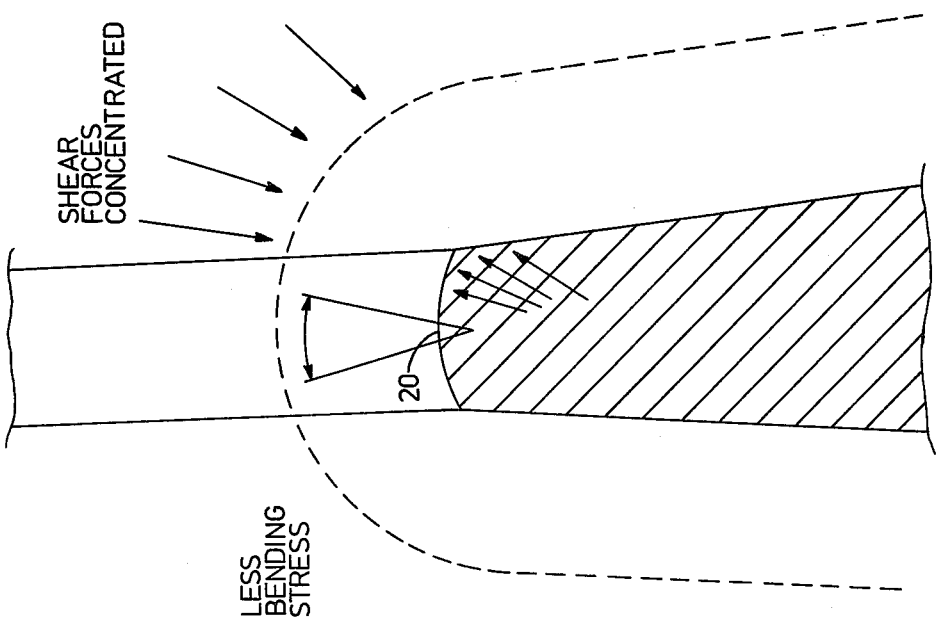
FIG. 7 is an enlarged view in partial cross-section showing the effective stress area of the tool of the invention.

The effective area of the prior art tool of U.S. Pat. No. 3,783,715 is shown in FIG. 6 compared to that of the invention in FIG. 7. In the prior art tool the cord-driving pedestal, indicated at 22, is narrow and the cord is subjected to subtantially greater bending stress at the maximum stress point (where the frictional contact between the sides of the tool and the cord absorbs little (or none) of the forces of insertion) than in the inventive tool. Also in the prior art tool of FIG. 6, tapered recesses 24 are provided leading from cord-driving pedestal 22 toward the shank of the tool. These recesses 24 distribute and thereby minimize the shear forces of the puncture acting on the cord. By contrast, in the inventive tool, the cord-driving pedestal extends to the full thickness of portion 14 so that the shear forces are concentrated rather than distributed. This does not, however, cause any deleterious effect. In the drawings, the arrows in FIGS. 6 and 7 are intended to pictorialize the shear forces and their concentration. They are applied only to one side, because the forces on the other side are the same (in mirror image) and need not be repeated.

In FIG. 8 a cord-driving pedestal ratio to arrange stress area diameter of 50% is shown. This corresponds to the prior art tool. In FIG. 9 a ratio of 75% corresponding to the invention is shown. The tests which were performed which demonstrated the improved load-bearing capacity of the inventive tool, over the prior art were performed with tools having the respective pedestal ratios of FIGS. 8 and 9. The tool of FIG. 9 showed an increase in load-bearing capacity of 94% over that of FIG. 8. It is believed that the marked advantages of the invention commence when the pedestal ratio exceeds 60%.

It will be understood that since the tool of the invention increases the load-bearing capacity of any given cord, the tool of the invention permits the use of a weaker and more malleable cord than hitherto, and/or the use of larger diameter cords (flattened) or several cords of the same diameter. Other materials which previously could not be inserted without breakage such as tapes can also be used.

Since various modifications of the invention will now be apparent to those skilled in the art, it is my intention to confine the invention to the precise form shown but to limit it in terms of the expended claims.

I claim:

1. An insertion tool for a cord-type repair for tubeless tires comprising a substantially cylindrical, high carbon steel shank having a flattened portion at one end, having a thickness of about 0.1", walls in said flattened portion defining both an elongated axially aligned, narrow, elongated eye and an axially aligned slit communicating between the free end of said flattened portion and said eye, a substantially flat cord-driving pedestal at the base of said eye, extending the full thickness of said flattened portion and having rounded corners each having a radius of about 0.035", a portion of said eye at its base defining an effective stress diameter of 0.130" in the area occupied by a cord of appropriate size for threading into said eye while said cord is being subjected to the stress of insertion, and the width of said cord-driving pedestal being about 77% of the average diameter of said effective stress area.

2. A tool having a driving end and a hand-grip end for inserting cord-type repairs for belted radial tubeless tires having parallel reinforcing wires oriented in a given direction, said tool as defined in claim 1 further characterized by:

means along the midsection of said flattened portion for spreading said wires after insertion of the driving end between said wires comprising tapered surfaces along the lateral edges of the flattened portion expanding from the driving end toward the midsection of said flattened portion to a width substantially greater than the thickness of said flattened portion, whereby inserting the driving end between said wires, then turning the tool 90° and further inserting the tool spreads the wires and facilitates further penetration of said tool together with a cord-type repair in said eye, into said tire.

* * * * *